United States Patent
Otsuka et al.

(10) Patent No.: US 8,642,221 B2
(45) Date of Patent: Feb. 4, 2014

(54) SOLID OXIDE FUEL CELL DEVICE

(75) Inventors: Toshiharu Otsuka, Kitakyushu (JP);
Katsuhisa Tsuchiya, Kitakyushu (JP);
Tsukasa Shigezumi, Kitakyushu (JP);
Toshiharu Ooe, Kitakyushu (JP);
Kiyotaka Nakano, Kitakyushu (JP)

(73) Assignee: Toto Ltd., Fukuoka (JP)

( * ) Notice: Subject to any disclaimer, the term of this patent is extended or adjusted under 35 U.S.C. 154(b) by 599 days.

(21) Appl. No.: 12/893,387

(22) Filed: Sep. 29, 2010

(65) Prior Publication Data
US 2011/0076576 A1 Mar. 31, 2011

(30) Foreign Application Priority Data

Sep. 30, 2009 (JP) ................................. 2009-228610

(51) Int. Cl.
*H01M 8/04* (2006.01)
*H01M 8/06* (2006.01)

(52) U.S. Cl.
USPC ........... 429/430; 429/427; 429/428; 429/431; 429/423

(58) Field of Classification Search
None
See application file for complete search history.

(56) References Cited

U.S. PATENT DOCUMENTS

| 6,379,826 B1* | 4/2002 | Lacy ............................. 429/432 |
| 2002/0136939 A1* | 9/2002 | Grieve et al. .................... 429/23 |
| 2005/0042488 A1 | 2/2005 | Niedzwiecki et al. |
| 2005/0048337 A1* | 3/2005 | Matsubayashi et al. ........ 429/23 |

FOREIGN PATENT DOCUMENTS

| CN | 1286823 A | 3/2001 |
| JP | 61-096674 A | 5/1986 |
| JP | 04-058463 A | 2/1992 |
| JP | 07-307163 A | 11/1995 |
| JP | 10-241706 A | 9/1998 |
| JP | 3353406 B2 | 9/2002 |
| JP | 2004-199978 A | 7/2004 |
| JP | 2006-032262 A | 2/2006 |
| JP | 2006-202683 A | 8/2006 |

OTHER PUBLICATIONS

Extended European Search Report for European Application No. 10181380.6, dated Jan. 26, 2011, 5 pages.

* cited by examiner

*Primary Examiner* — Ula C Ruddock
*Assistant Examiner* — Matthew Van Oudenaren
(74) *Attorney, Agent, or Firm* — Brinks Gilson & Lione

(57) ABSTRACT

The present invention is directed to a solid oxide fuel cell system with a load following function. The system sets a command power value, based on the amount of load, and instructs an inverter to achieve a permitted power value corresponding to the command power value, which is a permitted amount of power to be extracted from the fuel cell system. The system also changes an amount of change per unit time in the next inverter permitted power value.

6 Claims, 12 Drawing Sheets

SOLID OXIDE FUEL CELL DEVICE

RELATED APPLICATIONS

This application claims priority under 35 U.S.C. §119 to Japanese Patent Application No. 2009-228610 filed on Sep. 30, 2009, the entire content of which is hereby incorporated by reference.

BACKGROUND OF THE INVENTION

1. Technical Field

The present invention relates to a solid oxide fuel cell device, and more particularly to a solid oxide fuel cell device furnished with a load following function for changing the amount of fuel supplied in accordance with the amount of required power load.

2. Description of the Related Art

The most important issue in attaining a practical fuel cell device is how to achieve the two-fold goal of preventing fuel cell breakage and saving energy (reduce electrical grid power from commercial power sources and increase generated power from fuel cells).

Research is currently underway toward the development of practical solid oxide fuel cell (also referred to below as "SOFC") device. The SOFC device operates at relatively high temperatures, using an oxide ion-conducting solid electrolyte as an electrolyte, with electrodes placed on each side thereof, supplying fuel gas on one side and oxidizer (air, oxygen, or the like) on the other.

In such SOFC device, because the volume of hydrogen and air supplied to the fuel cells are extremely minute prior to reaching the state in which the hydrogen (fuel) and oxygen supplied to the fuel cells are being stably supplied to the entirety of the fuel cells (e.g., to 160 fuel cells connected in series), the problem arises that time is required until uniformity in the supply of hydrogen and air amounts is achieved in each fuel cell. An additional problem was the long time required until the target electrical generating reaction could be stably conducted in all of the fuel cells, due to factors such as individual differences and temperature differences between the fuel cells. In addition to the problems of reformer hydrogen reform delay and non-achievement of the hydrogen reform volume target values, the problem also arose in the SOFC device that time was required for the process of reaching the ideal state, due to these various difficult-to-control and uncertain elements.

From one perspective, because SOFC electricity cannot be sold to utilities it is necessary from an energy saving standpoint to perform load-following control, whereby the amount of fuel supplied is made to follow changes in power required of the fuel cell device, which in turn is determined by user (general households, etc.) demand power, and varies with time of day and the like. However, when load following is implemented there is a risk that because of changes in items such as the supply amounts of fuel, air, and water, the amounts of fuel and air supplied to individual fuel cells will be non-uniform, or the flow volumes supplied to the reformer will be different from target values, etc. There is also a risk that large differences in the amount of electricity generated will arise between individual fuel cells because of temperature changes in the fuel cells associated with load following control. The above-described unstable conditions can lead to severe situations in which fuel cells fail.

To resolve such problems, JP-07-307163-A discloses a fuel cell device (a phosphoric acid fuel cell device) in which power is output by instructing an inverter permitted current value to the fuel cell, using a delay time after instructing a gas increase or decrease amount determined by the amount of change in load; in the method of JP-07-307163-A, breakage of fuel cells caused by fuel depletion can be suppressed, since during load following power is not extracted until the amount of fuel is ideal. However, because this type of time delay occurs when extracting electrical power, load following characteristics are degraded, so from an energy saving standpoint, this solution alone is not enough. The fuel cell of JP-07-307163-A is thus unable to solve the dual problem of increasing energy saving performance and preventing breakage of fuel cells.

In addition, JP-3353406-B discloses a following-type fuel cell device in which AC output is controlled by obeying externally supplied load commands. The fuel cell device of PJP-3353406-B uses feedback control to perfectly follow output current from the fuel cell relative to changes in load; in addition it also restricts the rate of change in output current from exceeding a predetermined rate.

SUMMARY OF THE INVENTION

As described above, in order to raise energy saving performance, it is desirable, as in the fuel cell device (fuel cell generating device) shown in JP-3353406-B, to rapidly conform the inverter permitted current value (inverter permitted power value), which instructs extraction of power from the fuel cell device to the load amount so that it rapidly follows the load amount, thereby changing the rate of increase and rate of decrease to an appropriate value. In fuel cell device, however, because of delays in the supply of fuel and water to the reformer, delays in the reforming reaction, and, as described above, an uncertain time delay under various conditions in the fuel cell device as well, ideal conditions may not be achieved due to the various time delays in the SOFC device, even when the inverter permitted current value rate of increase or rate of decrease are changed to ideal design values; this leads to the issue (problem) of fuel cell breakage. In other words, these characteristics of fuel cell device mean that feedback control is difficult, and there is no alternative to feed forward control. For this reason, it was conventionally believed that speeding up load following would be difficult.

Moreover, the SOFC device had inherent major problems of its own. For example, it is physically impossible in general use storage batteries to extract an amount of electrical power from the storage battery which exceeds the limit of what can be extracted, and if it is the case that breakage does not occur, control can be implemented easily. In the SOFC device, however, if an instruction to extract electrical power in excess of a limit value is given, that power can be extracted from the fuel cells, and that excessive power extraction leads to breakage of the fuel cells. Because of this inherent problem, there has been a perception that very high precision control must be imposed on the SOFC device in order to improve load following performance amidst the various elements of uncertainty, thus making it extremely difficult to improve SOFC energy saving performance.

Under such circumstances, the inventors undertook diligent research to solve the inherent problems of the SOFC device and discovered that under certain conditions, fuel cell breakage could be prevented and energy saving performance assured even when the rate of increase or rate of decrease (amount of change per unit time) in command power values (or command current values) is changed.

It is therefore an object of the present invention to provide a solid oxide fuel cell device capable of solving the dual problems of increasing energy saving performance by improving the load following function and preventing breakage of fuel cells.

The above object is achieved according to the present invention by providing a solid oxide fuel cell device with a load following function for changing a fuel supply rate in response to a load defined as a required power determined by demand power, comprising a fuel cell module having a fuel cell stack composed of a plurality of solid oxide fuel cells and a reformer for reforming fuel and supplying the fuel to the fuel cells; inverter means for receiving electrical power generated by the fuel cell module and converting the power to alternating power; command power value setting means for setting a command power value to be generated by the fuel cell module based on an amount of the load; fuel control means for determining an fuel supply rate and supplying the fuel by the fuel supply rate to the fuel cells so as to generate the command power value; inverter permitted power value instruction means for instructing to the inverter means an inverter permitted power value corresponding to the command power value, which is the permitted amount of power to be extracted from the fuel cell module, after the fuel has been supplied by the fuel supply rate to the fuel cells by the fuel control means; and inverter permitted power value change means for changing the amount of change per unit time in the next inverter permitted power value and outputting the changed amount to the inverter permitted power value instruction means; wherein the inverter permitted power value change means presets a plurality of proportionality characteristics respectively indicating the differing multiple amounts of change per unit time, selecting one proportionality characteristic from among the plurality of proportionality characteristics based on status of the load, changing the amount of change per unit time in the next inverter permitted power value by using the selected proportionality characteristic.

In the present invention thus constituted, a command power value to be generated by the fuel cell module is set based on a load amount, and the amount of change in the inverter permitted power value per unit time, which is the amount of power permitted to be extracted from the fuel cell module instructed to the inverter means based on the load status, is changed so as to differ, thus preventing fuel cell breakage associated with fuel depletion or air depletion, while saving energy by improving load following characteristics, thus increasing generated power from the fuel cell and reducing grid power from commercial power sources.

In addition, in the present invention, a plurality of proportionality characteristics indicating multiple differing amounts of change per unit time are preset; one proportionality characteristic is selected from among the plurality of proportionality characteristics based on the status of load, and the amount of change per unit time in the next inverter permitted power value is changed by using the selected proportionality characteristic, thereby simplifying fuel cell control and stabilizing changes in inverter permitted power value with respect to changing load status, with the result that the fuel supply, air supply, and reform reaction can be stabilized.

In a preferred embodiment of the present invention, the inverter permitted power value change means changes the amount of change per unit time in the next inverter permitted power value in accordance with whether the amount of change in load from the past to the present is large or small, and selects a proportionality characteristic for a smaller amount of change per unit time when the load change amount is small than when the load change amount is large as the amount of change per unit time for the next inverter permitted power value change means.

When the amount of change in load from the past to the present is large, the amounts of fuel and air supplied to the fuel cell module increase; fuel and air pressure fluctuations become large due to this increase in supply amount, and a uniform supply can be effected to each of the fuel cells. In contrast, when the amount of change in the load is small, the fluctuation in fuel and air pressure is also small, making it difficult to supply each of the fuel cells in a uniform manner. Therefore in the present invention, a smaller proportionality characteristic in change per unit time is selected as the amount of change per unit time for the next inverter permitted power value when the amount of load change is small as compared to when the amount of load change is large, so target amounts of fuel and air are not supplied in a portion of the fuel cells; notwithstanding the partially insufficient state, the inverter extracts electrical power, thereby enabling the prevention of degradation or breakage of fuel cells.

In another preferred embodiment of the present invention, the inverter permitted power value change means changes the amount of change per unit time in the next inverter permitted power value in accordance with whether the amount of change in load from the past to the present is positive or negative, and selects a proportionality characteristic for a larger amount of change per unit time when the load change amount is negative than when the load change amount is positive as the amount of change per unit time for the next inverter permitted power value.

In the present invention thus constituted, when the amount of change per unit time in the inverter permitted power value from the past to the present is negative, i.e., when load decreases, the amount of change for the next inverter permitted power value is selected to have a proportionality characteristic by which the amount of change per unit time is greater than when load increases, therefore when excessive fuel is being supplied relative to the target, the supply of fuel can be quickly reduced to the target value, thereby increasing fuel cell following performance and preventing unnecessary fuel waste. On the other hand, when the load suddenly increases it is necessary to supply fuel and air in amounts suited to the increase in inverter permitted power value in order to increase the next inverter permitted power value, but at this point fuel or air supply delays or fuel reforming delays may occur, so that some time is needed until a state is achieved whereby power is actually extracted from the fuel cell module, leading to a risk of fuel cell degradation or breakage if inverter power is extracted before that. Therefore in the present invention when the amount of change per unit time in the inverter permitted power value from the past to the present is positive, i.e., when the load amount suddenly increases, a small proportionality characteristic in the change amount per unit time is selected as the amount of change per unit time in inverter permitted power value, thus enabling the suppression of problems caused by following delays in the fuel cell module, and reliably preventing degradation or breakage of fuel cells caused by excessive inverter-induced power extraction.

In still another embodiment of the present invention, the inverter permitted power value change means changes the amount of change per unit time in the next inverter permitted power value, when the deviation in the present inverter permitted power value relative to the target inverter permitted power value is positive and the load amount is declining from the present to the next, so that a decrease in the amount of change in the next inverter permitted power value is suppressed.

In the present invention thus constituted, when the deviation of the present inverter permitted power value is positive relative to the target inverter permitted power value, the load amount is theoretically in a declining state, therefore the deviation in the present inverter permitted power value relative to the target inverter permitted power value should become negative, however in actuality the deviation between the target value and the power inverter permitted power value is positive, and the size of the deviation is small, due to the fuel cell module following delay. Therefore in the present invention, under those circumstances, the amount of change per unit time in the next inverter permitted power value is changed so as to suppress a decrease in the amount of change in the next inverter permitted power value, thereby shortening the time needed to approach the target inverter permitted power value, resulting in an increase in generated power obtained from the fuel cell and a decrease in grid power obtained from commercial power supplies, thereby saving energy.

In still another embodiment of the present invention, the inverter permitted power value change means changes the amount of change per unit time in the next inverter permitted power value in accordance with the present inverter permitted power value, and selects a proportionality characteristic with a larger rate of change for the case when the present inverter permitted power value is large than when the present inverter permitted power value is small as the amount of change per unit time for the next inverter permitted power value.

In the present invention thus constituted, when the amount of power currently being generated by the fuel cell module is high, an electrical generating reaction is occurring, and the fuel cells are also stable at a high temperature, therefore the amount of change per unit time when changing from the present inverter permitted power value to the next inverter permitted power value allows for adverse effects on the fuel cells to be suppressed more when the present inverter permitted power value is large than when the amount of power generated by the fuel cell module is small, even when following sensitivity is raised by selecting a proportionality characteristic with a large amount of change per unit time.

In still another embodiment of the present invention, the inverter permitted power value change means changes the amount of change per unit time for the next inverter permitted power value in accordance with the status of the past inverter permitted power value and, when the past inverter permitted power value is increasing and the next inverter permitted power value is also increasing, selects a proportionality characteristic with a larger amount of change per unit time as the amount of change per unit time for the next inverter permitted power value, the larger the change amount per unit time in the past inverter permitted power value is.

When the amount of change per unit time in the inverter permitted power value from the past to the present is small, a large amount of change per unit time in the inverter permitted power value from the present to the next will cause a sudden change, leading to a risk of fuel reforming delays in the reformer or fuel or air supply delays and the like. At the same time, when the amount of change per unit time in the inverter permitted power value from the past to the present is large, the supply amounts of fuel, air, and water are currently in the process of changing at a predetermined rate of change; in such cases, because the system is already in the process of changing, the occurrence of large fuel reform delays or fuel and air supply delays can be prevented even if the amount of change per unit time in the inverter permitted power value is large from the present to the next. Therefore in the present invention, when the past inverter permitted power value is increasing and the next inverter permitted power value is increasing, a proportionality characteristic for a large amount of change per unit time is selected as the amount of change per unit time for the next inverter permitted power value, to the degree that the past inverter permitted power value amount of change per unit time is large, therefore adverse effects on the fuel cells can be suppressed, following characteristics improved, and energy savings increased.

In still another embodiment of the present invention, the inverter permitted power value change means changes the amount of change per unit time in the next inverter permitted power value in accordance with the deviation of the present inverter permitted power value relative to the target inverter permitted power value, and selects the proportionality characteristic for the amount of change per unit time in the next inverter permitted power value so that the larger the amount of change per unit time is for the next inverter permitted power value, the larger the deviation is.

In the present invention thus constituted, a proportionality characteristic with a large amount of change per unit time is selected so that the larger the amount of change per unit time in the next inverter permitted power value relative to the target inverter permitted power value is, the larger the deviation in the present inverter permitted power value relative to the target inverter permitted power value is, therefore following characteristics can be improved, while in the convergence process in which deviation decreases, a proportionality characteristic with a small amount of change per unit time is selected, so that the inverter permitted power value slowly reaches the target inverter permitted power value, thereby reliably preventing fuel depletion.

The above object is also achieved according to the present invention by providing a solid oxide fuel cell device with a load following function for changing a fuel supply rate in response to a load defined as a required power determined by demand power, comprising a fuel cell module having a fuel cell stack composed of a plurality of solid oxide fuel cells and a reformer for reforming fuel and supplying the fuel to the fuel cells, an inverter for receiving electrical power generated by the fuel cell module and converting the power to alternating power, a command power value setting device for setting a command power value to be generated by the fuel cell module based on an amount of the load, a fuel controller for determining an fuel supply rate and supplying the fuel by the fuel supply rate to the fuel cells so as to generate the command power value, an inverter permitted power value instruction device for instructing to the inverter an inverter permitted power value corresponding to the command power value, which is the permitted amount of power to be extracted from the fuel cell module, after the fuel has been supplied by the fuel supply rate to the fuel cells by the fuel controller, and an inverter permitted power value change device for changing the amount of change per unit time in the next inverter permitted power value and outputting the changed amount to the inverter permitted power value instruction device, wherein the inverter permitted power value change device presets a plurality of proportionality characteristics respectively indicating the differing multiple amounts of change per unit time, selecting one proportionality characteristic from among the plurality of proportionality characteristics based on status of the load, changing the amount of change per unit time in the next inverter permitted power value by using the selected proportionality characteristic.

The above and other objects and features of the present invention will be apparent from the following description by taking reference with accompanying drawings employed for preferred embodiments of the present invention.

DETAILED DESCRIPTION OF THE PREFERRED EMBODIMENTS

Next, referring to the attached drawings, a solid oxide fuel cell (SOFC) device according to an embodiment of the present invention will be explained.

Figure 1:
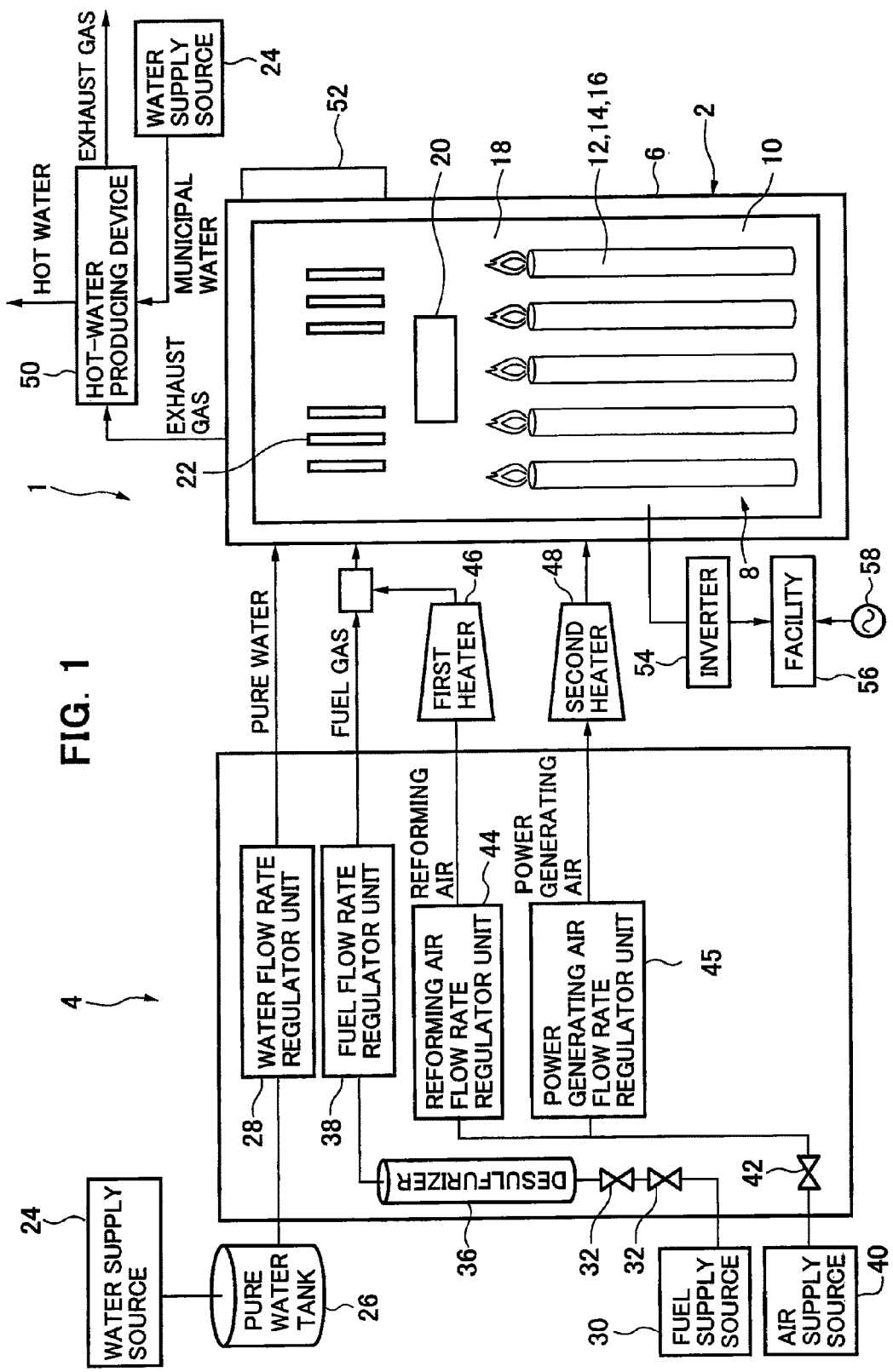
FIG. 1 is a schematic overview showing a solid oxide fuel cell device according to an embodiment of the present invention.

As shown in FIG. 1, a solid oxide fuel cell (SOFC) device according to an embodiment of the present invention is furnished with a fuel cell module 2 and an auxiliary unit 4.

The fuel cell module 2 is furnished with a housing 6; a sealed space 8 is formed within the housing 6, mediated by insulating material (not shown, however the insulating material is not an indispensable structure and may be omitted). Note that it is acceptable to provide no insulating material. A fuel cell assembly 12 for carrying out the power generating reaction between fuel gas and oxidant (air) is disposed in the power generating chamber 10 at the lower portion of this sealed space 8. This fuel cell assembly 12 is furnished with ten fuel cell stacks 14 (see FIG. 5), and the fuel cell stack 14 comprises 16 fuel cell units 16 (see FIG. 4). Thus, the fuel cell assembly 12 has 160 fuel cell units 16, all of which are serially connected.

A combustion chamber 18 is formed above the aforementioned power generating chamber 10 in the sealed space 8 of the fuel cell module 2. Residual fuel gas and residual oxidant (air) not used in the power generation reaction is combusted in this combustion chamber 18 to produce exhaust gas.

A reformer 20 for reforming fuel gas is disposed at the top of the combustion chamber 18; the reformer 20 is heated by the heat of residual gas combustion to a temperature at which the reforming reaction can take place. An air heat exchanger 22 for receiving the heat of combustion and heating the air is further disposed above this reformer 20.

Next, the auxiliary unit 4 is furnished with a pure water tank 26 for holding water from a municipal or other water supply source 24 and filtering it into pure water, and a water flow rate regulator unit 28 (a "water pump" or the like driven by a motor) for regulating the flow rate (litter per minute) of water supplied from the reservoir tank. The auxiliary unit 4 is further furnished with a gas shutoff valve 32 for shutting off the fuel gas supply from a fuel supply source 30 such as municipal gas or the like, a desulfurizer 36 for desulfurizing the fuel gas, and a fuel gas flow rate regulator unit 38 (a "fuel pump" or the like driven by a motor) for regulating the flow rate (litter per minute) of fuel gas. Furthermore, an auxiliary unit 4 is furnished with an electromagnetic valve 42 for shutting off air serving as an oxidant and supplied from an air supply source 40, and a reforming air flow rate regulator unit 44 and generating air flow rate regulator unit 45 ("air blower" or the like driven by a motor) for regulating air flow rate (litter per minute).

Note that in the SOFC device according to the embodiment of the present invention, there is no heating means such as a heater for heating the reforming air supply to the reformer 20 or the power generating air supply to the power generating chamber 10 in order to efficiently raise the temperature at startup, nor is there a heating means for separately heating the reformer 20.

Next, a hot-water producing device 50 supplied with exhaust gas is connected to the fuel cell module 2. Municipal water from a water supply source 24 is supplied to this hot-water producing device 50; this water is turned into hot water by the heat of the exhaust gas, and is supplied to a hot water reservoir tank in an external water heater (not shown).

The fuel cell module 2 is provided with a control box 52 for controlling the supply flow rates of fuel gas and the like.

Furthermore, an inverter 54 serving as an electrical power extraction unit (electrical power conversion unit) for supplying electrical power generated by the fuel cell module to the outside is connected to the fuel cell module 2.

Figure 2:
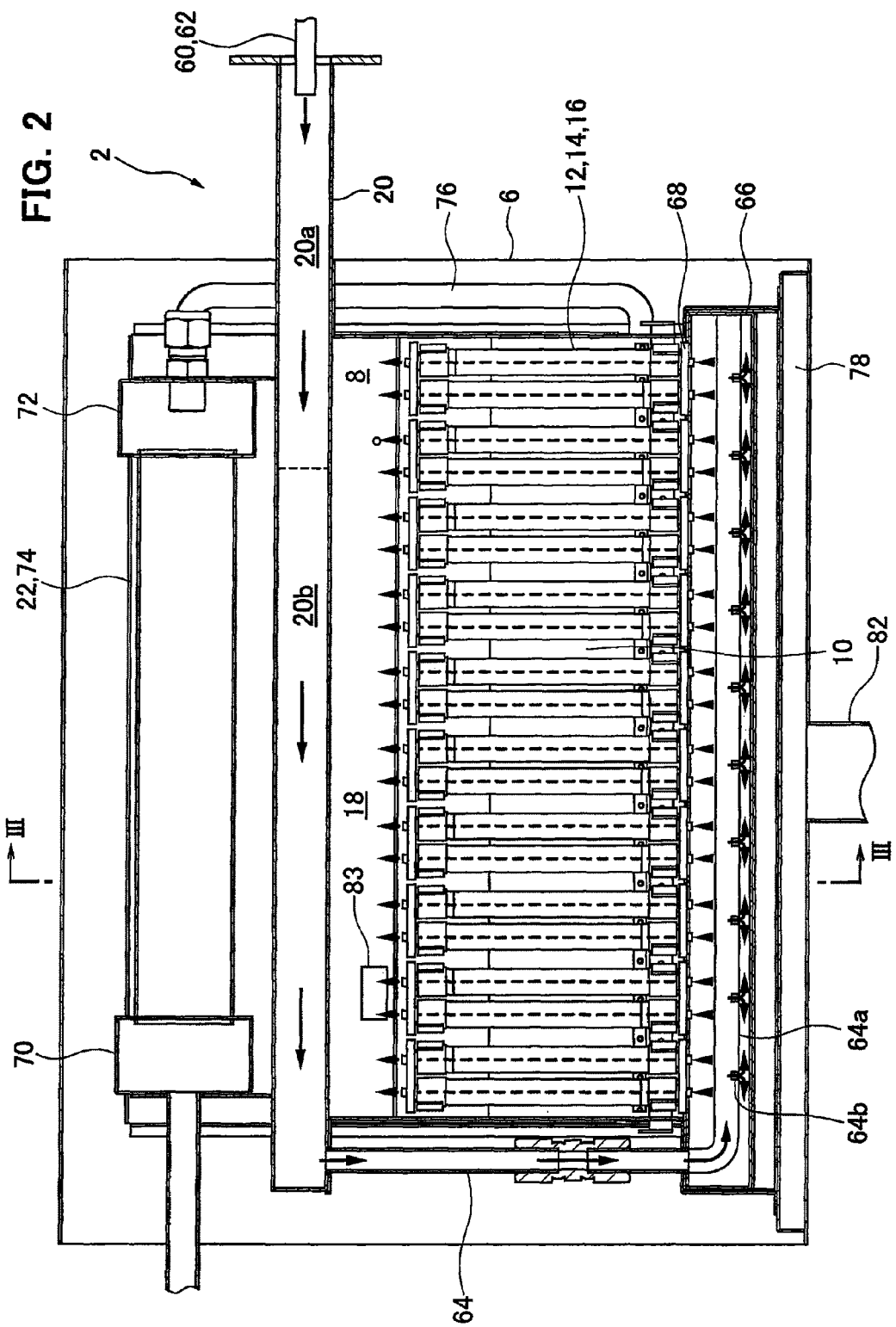
FIG. 2 is a front sectional view showing a fuel cell module in a solid oxide fuel cell device according to an embodiment of the present invention.
Figure 3:
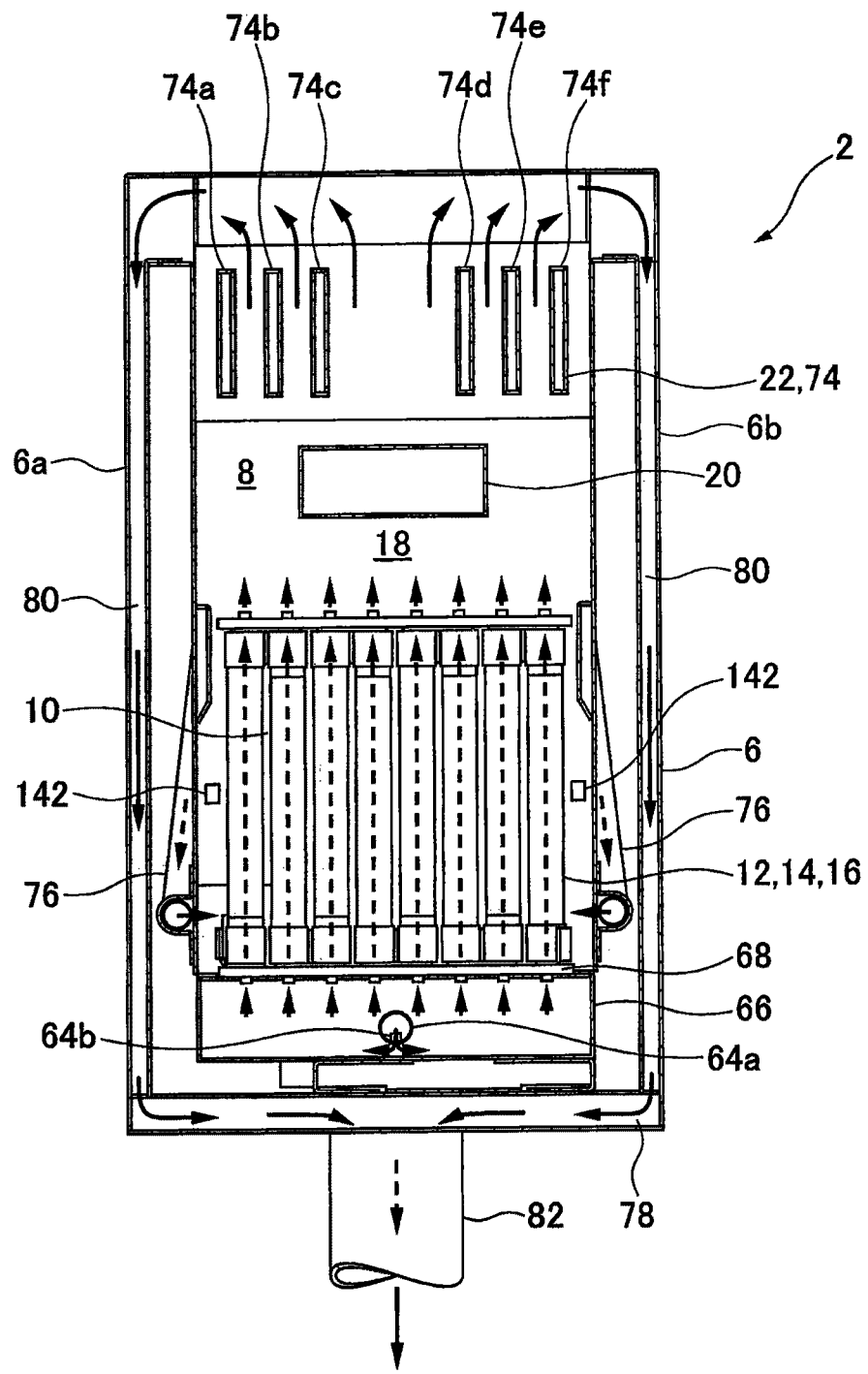
FIG. 3 is a sectional view along a line in FIG. 2.

The internal structure of the solid oxide fuel cell (SOFC) device according to the embodiment of the present invention is explained using FIGS. 2 and 3.

As shown in FIGS. 2 and 3, a fuel cell assembly 12, a reformer 20, and an air heat exchanger 22 are arranged in sequence starting from the bottom in the sealed space 8 within the fuel cell module 2 housing 6, as described above.

A pure water guide pipe 60 for introducing pure water on the upstream end of the reformer 20, and a reform gas guide pipe 62 for introducing the fuel gas and reforming air to be reformed, are attached to the reformer 20; a vaporizing section 20a and a reforming section 20b are formed in sequence starting from the upstream side within the reformer 20, and the reforming section 20b is filled with a reforming catalyst. Fuel gas and air blended with the steam (pure water) introduced into the reformer 20 is reformed by the reforming catalyst used to fill in the reformer 20. Appropriate reforming catalysts are used, such as those in which nickel is imparted to the surface of alumina spheres, or ruthenium is imparted to alumina spheres.

A fuel gas supply line 64 is connected to the downstream end of the reformer 20; this fuel gas supply line 64 extends downward, then further extends horizontally within a manifold formed under the fuel cell assembly 12. Multiple fuel supply holes 64b are formed on the bottom surface of a horizontal portion 64a of the fuel gas supply line 64; reformed fuel gas is supplied into the manifold 66 from these fuel supply holes 64b.

A lower support plate 68 provided with through holes for supporting the above-described fuel cell stack 14 is attached at the top of the manifold 66, and fuel gas in the manifold 66 is supplied into the fuel cell unit 16.

An air heat exchanger 22 is provided over the reformer 20. The air heat exchanger 22 is furnished with an air concentration chamber 70 on the upstream side and two air distribution chambers 72 on the downstream side; the air concentration chamber 70 and the distribution chambers 72 are connected using six air flow conduits 74. Here, as shown in FIG. 3, three air flow conduits 74 form a set (74a, 74b, 74c, 74d, 74e, 74f); air in the air concentration chamber 70 flows from each set of the air flow conduits 74 to the respective air distribution chambers 72.

Air flowing in the six air flow conduits 74 of the air heat exchanger 22 is pre-heated by rising combustion exhaust gas from the combustion chamber 18.

Air guide pipes 76 are connected to each of the respective air distribution chambers 72; these air guide pipes 76 extend downward, communicating at the bottom end side with the lower space in the generating chamber 10, and introducing preheated air into the generating chamber 10.

Next, an exhaust gas chamber 78 is formed below the manifold 66. As shown in FIG. 3, an exhaust gas conduit 80 extending in the vertical direction is formed on the insides of the front surface 6a and the rear surface 6b which form the faces in the longitudinal direction of the housing 6; the top inside of the exhaust gas conduit 80 communicates with the space in which the air heat exchanger to rule 22 is disposed, and the bottom end side communicates with the exhaust gas chamber 78. An exhaust gas discharge pipe 82 is connected at approximately the center of the bottom surface of the exhaust gas chamber 78; the downstream end of the exhaust gas discharge pipe 82 is connected to the above-described hot water producing device 50 shown in FIG. 1.

As shown in FIG. 2, an ignition device 83 for starting the combustion of fuel gas and air is disposed on the combustion chamber 18. No heating means such as a burner or the like for separately heating the combustion chamber 18 or the fuel cell unit 16 to support ignition at startup or prevent flameout or blow out is provided on the combustion chamber 18.

Figure 4:
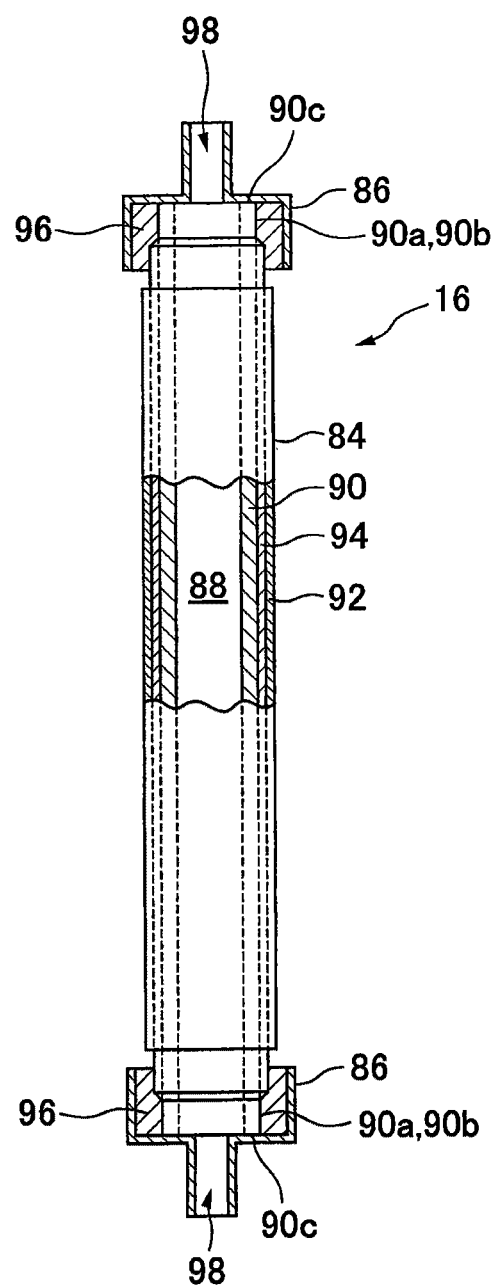
FIG. 4 is a partial sectional view showing the fuel cell unit of a solid oxide fuel cell device according to an embodiment of the present invention.

Next, referring to FIG. 4, the fuel cell unit 16 will be explained. As shown in FIG. 4, the fuel cell unit 16 is furnished with a fuel cell 84 and internal electrode terminals 86, respectively connected to the respective terminals at the top and bottom of the fuel cell 84.

The fuel cell 84 is a tubular structure extending in the vertical direction, furnished with a cylindrical internal electrode layer 90, on the inside of which is formed a fuel gas flow path 88, a cylindrical external electrode layer 92, and an electrolyte layer 94 between the internal electrode layer 90 and the external electrode layer 92. The internal electrode layer 90 is a fuel electrode through which fuel gas passes, and is a (−) pole, while the external electrode layer 92 is an air electrode for contacting the air, and is a (+) pole.

The internal electrode terminals 86 attached at the top and bottom ends of the fuel cell unit 16 have the same structure, therefore the internal electrode terminal 86 attached at the top end side will be specifically explained. The top portion 90a of the inside electrode layer 90 is furnished with an outside perimeter surface 90b and top end surface 90c, exposed to the electrolyte layer 94 and the outside electrode layer 92. The inside electrode terminal 86 is connected to the outer perimeter surface 90b of the inside electrode layer 90 through a conductive seal material 96, and is electrically connected to the inside electrode layer 90 by making direct contact with the top end surface 90c of the inside electrode layer 90. A fuel gas flow path 98 communicating with fuel gas flow path 88 in the inside electrode layer 90 is formed at the center portion of the inside electrode terminal 86.

The inside electrode layer 90 is formed, for example, from at least one of a mixture of Ni and zirconia doped with at least one type of rare earth element selected from among Ca, Y, Sc, or the like; or a mixture of Ni and ceria doped with at least one type of rare earth element; or any mixture of Ni with lanthanum gallate doped with at least one element selected from among Sr, Mg, Co, Fe, or Cu.

The electrolyte layer 94 is formed, for example, from at least one of the following: zirconia doped with at least one type of rare earth element selected from among Y, Sc, or the like; ceria doped with at least one type of selected rare earth element; or lanthanum gallate doped with at least one element selected from among Sr or Mg.

The outside electrode layer 92 is formed, for example, from at least one of the following: lanthanum manganite doped with at least one element selected from among Sr or Ca; lanthanum ferrite doped with at least one element selected from among Sr, Co, Ni, or Cu; lanthanum cobaltite doped with at least one element selected from among Sr, Fe, Ni, or Cu; Ag, or the like.

Figure 5:
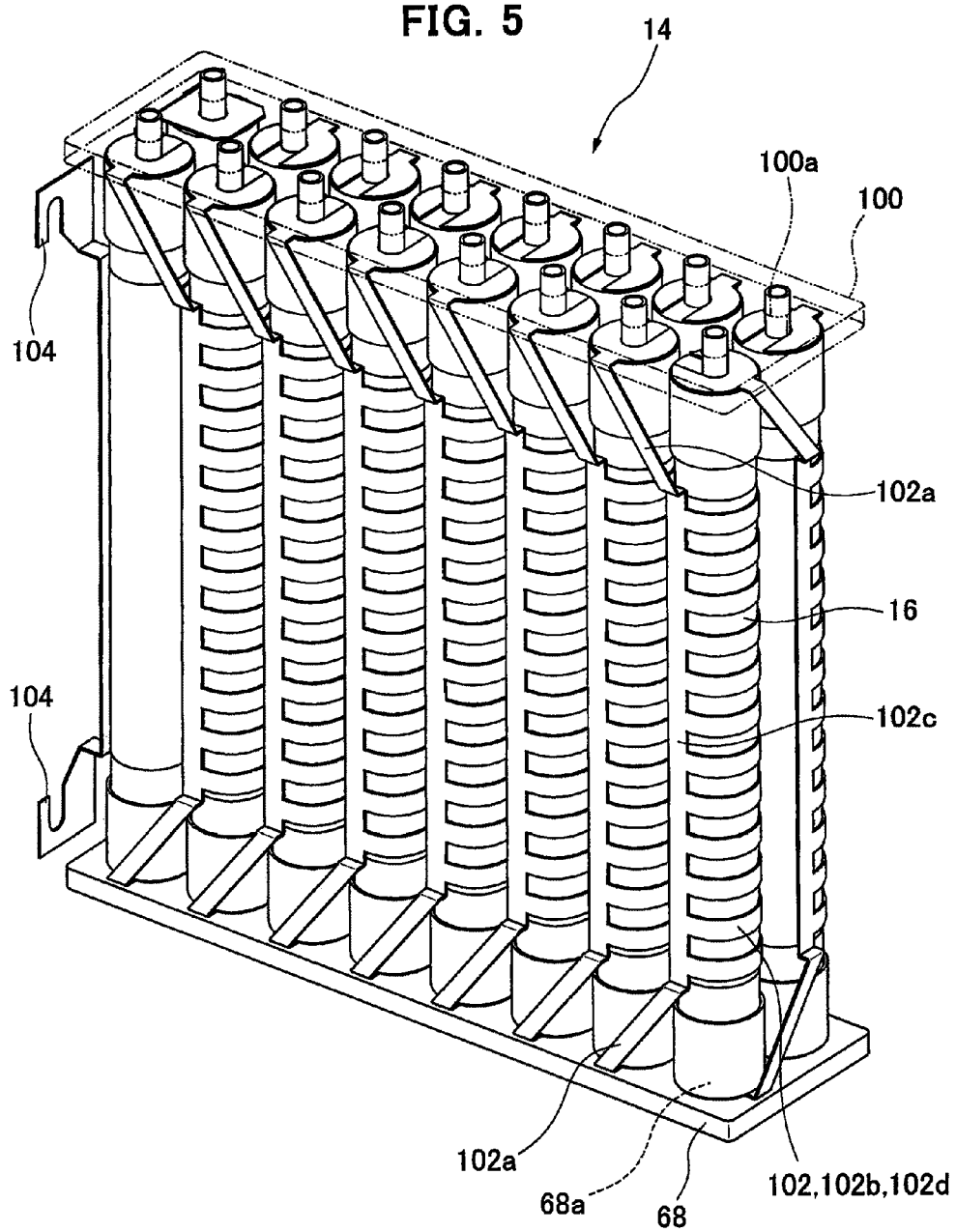
FIG. 5 is a perspective view showing the fuel cell stack in a solid oxide fuel cell device according to an embodiment of the present invention.

Next, referring to FIG. 5, the fuel cell stack 14 will be explained. As shown in FIG. 5, the fuel cell stack 14 is furnished with sixteen fuel cell units 16; the top sides and bottom sides of these fuel cell units 16 are respectively supported by a lower support plate 68 and upper support plate 100. Through holes 68a and 100a, through which the inside electrode terminal 86 can penetrate, are provided on the lower support plate 68 and upper support plate 100.

In addition, a current collector 102 and an external terminal 104 are attached to the fuel cell unit 16. The current collector 102 is integrally formed by a fuel electrode connecting portion 102a, which is electrically connected to the inside electrode terminal 86 attached to the inside electrode layer 90 serving as the fuel electrode, and by an air electrode connecting portion 102b, which is electrically connected to the entire external perimeter of the outside electrode layer 92 serving as the air electrode. The air electrode connecting portion 102b is formed of a vertical portion 102c extending vertically along the surface of the outside electrode layer 92, and multiple horizontal portions 102d extending in the horizontal direction from the vertical portion 102c along the surface of the outside electrode layer 92. The fuel electrode connecting portion 102a extends linearly in an upward or downward diagonal direction from the vertical portion 102c of the air electrode connecting portion 102b toward the inside electrode terminals 86 positioned in the upper and lower directions on the fuel cell unit 16.

Furthermore, inside electrode terminals 86 at the top and bottom ends of the two fuel cell units 16 positioned at the end of the fuel cell stack 14 (at the front and back sides on the left edge in FIG. 5) are respectively connected to the external terminals 104. These external terminals 104 are connected to the external terminals 104 (not shown) at the ends of the adjacent fuel cell stack 14, and as described above, all of the 160 fuel cell units 16 are connected in series.

Next, referring to FIG. 6, the sensors attached to the solid oxide fuel cell (SOFC) device according to the embodiment of the present invention will be explained.

Figure 6:
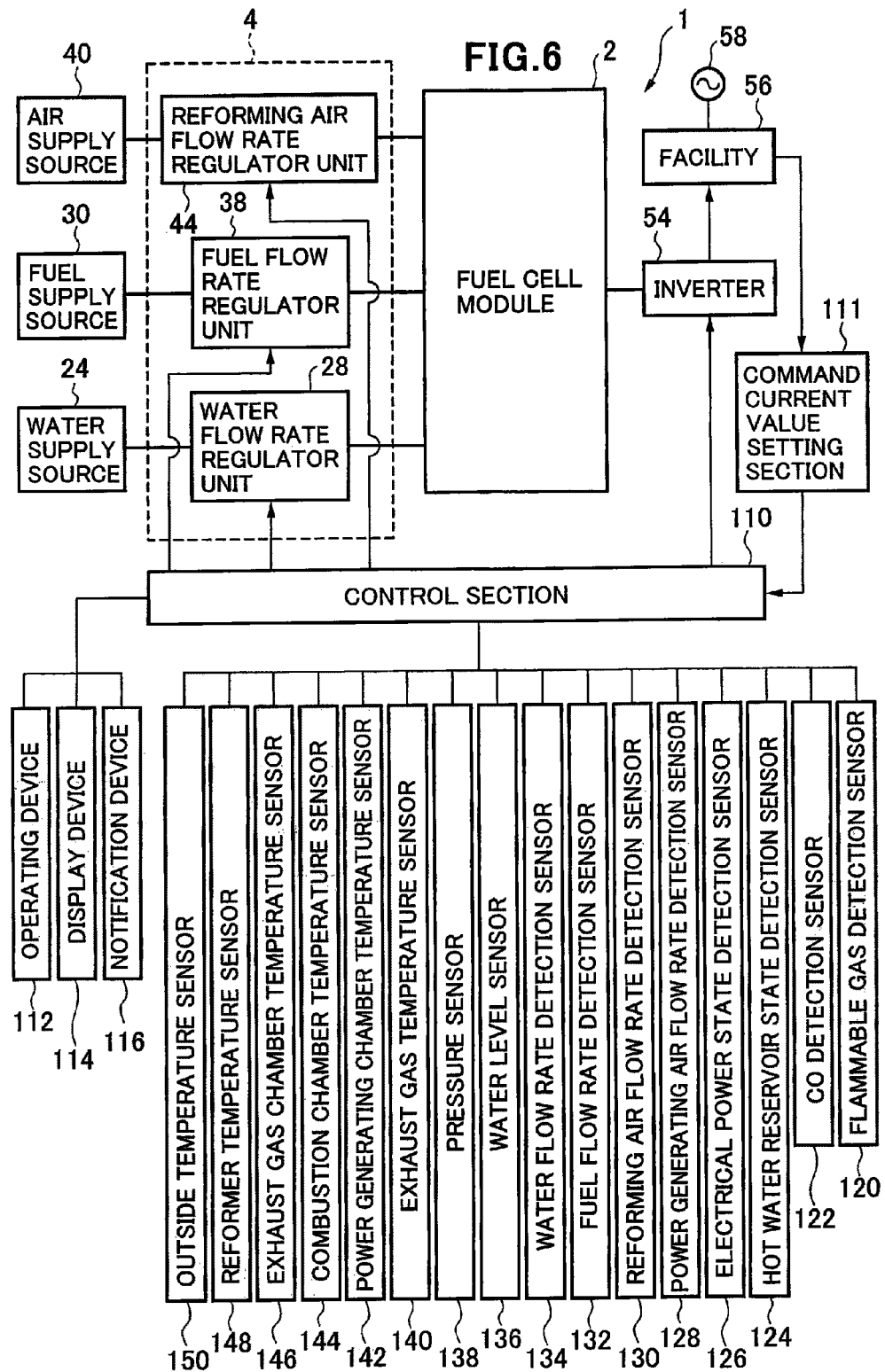
FIG. 6 is a block diagram showing a solid oxide fuel cell device according to an embodiment of the present invention.

As shown in FIG. 6, a solid oxide fuel cell device 1 is furnished with a control unit 110, an operating device 112 provided with operating buttons such as "ON" or "OFF" for user operation, a display device 114 for displaying various data such as a generator output value (Watts), and a notification device 116 for issuing warnings during abnormal states and the like are connected to the control unit 110. The notification device 116 may be connected to a remote control center to inform the control center of abnormal states.

Next, signals from the various sensors described below are input to the control unit 110.

First, a flammable gas detectionسsensor 120 detects gas leaks and is attached to the fuel cell module 2 and the auxiliary unit 4.

The purpose of the flammable gas detection sensor 120 is to detect leakage of CO in the exhaust gas, which is meant to be exhausted to the outside via the exhaust gas conduit 80 and the like, into the external housing (not shown) which covers the fuel cell module 2 and the auxiliary unit 4.

A water reservoir state detection sensor 124 detects the temperature and amount of hot water in a water heater (not shown).

An electrical power state detection sensor 126 detects current, voltage, and the like in the inverter 54 and in a distribution panel (not shown).

A power generating air flow rate detection sensor 128 detects the flow rate of power generating air supplied to the generating chamber 10.

A reforming air flow rate sensor 130 detects the flow rate of reforming air supplied to the reformer 20.

A fuel flow rate sensor 132 detects the flow rate of fuel gas supplied to the reformer 20.

A water flow rate sensor 134 detects the flow rate of pure water (steam) supplied to the reformer 20.

A water level sensor 136 detects the water level in pure water tank 26.

A pressure sensor 138 detects pressure on the upstream side outside the reformer 20.

An exhaust temperature sensor 140 detects the temperature of exhaust gas flowing into the hot water producing device 50.

As shown in FIG. 3, a generating chamber temperature sensor 142 is disposed on the front surface side and rear surface side around the fuel cell assembly 12, and detects the temperature around the fuel cell stack 14 in order to estimate the temperature of the fuel cell stack 14 (i.e., of the fuel cell 84 itself).

A combustion chamber temperature sensor 144 detects the temperature in combustion chamber 18.

An exhaust gas chamber temperature sensor 146 detects the temperature of exhaust gases in the exhaust gas chamber 78.

A reformer temperature sensor 148 detects the temperature of the reformer 20 and calculates the reformer 20 temperature from the intake and exit temperatures on the reformer 20.

If the solid oxide fuel cell (SOFC) device is placed outdoors, the outside temperature sensor 150 detects the temperature of the outside atmosphere. Sensors to detect outside atmospheric humidity and the like may also be provided.

Signals from these various sensors are sent to the control unit 110; the control unit 110 sends control signals to the water flow rate regulator unit 28, the fuel flow rate regulator unit 38, the reforming air flow rate regulator unit 44, and the power generating air flow rate regulator unit 45 based on data from the sensors, and controls the flow rates in each of these units.

The control unit 110 sends control signals to the inverter 54 to control the supplied electrical power.

Figure 7:
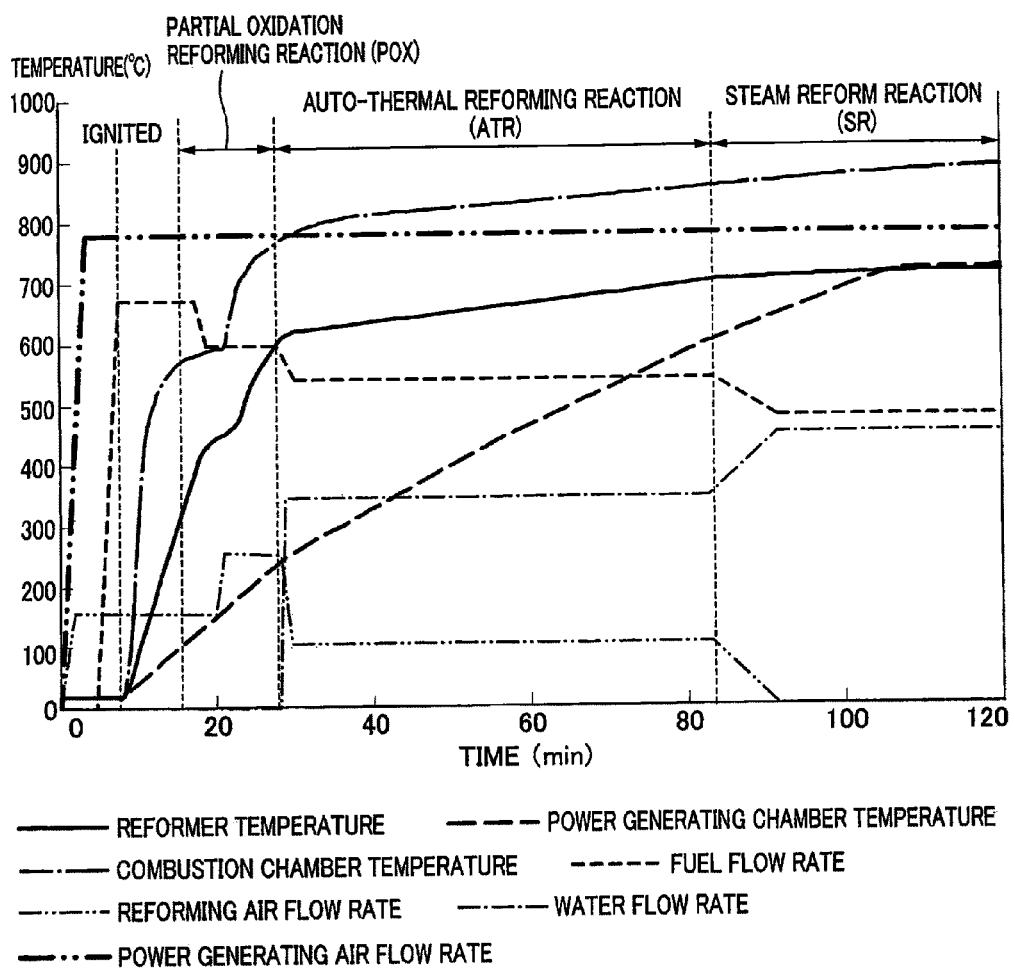
FIG. 7 is a timing chart showing an operation upon startup of a solid oxide fuel cell device according to an embodiment of the present invention.

Next, referring to FIG. 7, the operation of a solid oxide fuel cell (SOFC) device according to the present embodiment at the time of startup will be explained.

In order to warm up the fuel cell module 2, the operation starts in a no-load state, i.e., with the circuit which includes the fuel cell module 2 in an open state. At this point current does not flow in the circuit, therefore the fuel cell module 2 does not generate electricity.

First, reforming air is supplied from the reforming air flow rate regulator unit 44 to the reformer 20 on the fuel cell module 2. At the same time, power generating air is supplied from the generating air flow rate regulator unit 45 to an air heat exchanger 22 of the fuel cell module 2, and the power generating air reaches the generating chamber 10 and the combustion chamber 18.

Immediately thereafter, fuel gas is also supplied from the fuel flow rate regulator unit 38, and fuel gas into which reforming air is blended passes through the reformer 20, the fuel cell stack 14, and the fuel cell unit 16 to reach the combustion chamber 18.

Next, ignition is brought about by the ignition device 83, and fuel gas and air (reforming air and power generating air) supplied to the combustion chamber 18 is combusted. This combustion of fuel gas and air produces exhaust gas; the generating chamber 10 is warmed by the exhaust gas, and when the exhaust gas rises into the fuel cell module 2 sealed space 8, the fuel gas, which includes the reforming air in the reformer 20 is warm, as is the power generating air inside the air heat exchanger 22.

At this point, fuel gas into which the reforming air is blended is supplied to the reformer 20 by the fuel flow rate regulator unit 38 and the reforming air flow rate regulator unit 44, therefore the partial oxidation reforming reaction PDX given by Expression (1) proceeds in the reformer 20. This partial oxidation reforming reaction PDX is an exothermic reaction, and therefore has favorable starting characteristics. The fuel gas whose temperature has risen is supplied from the fuel gas supply line 64 to the bottom of the fuel cell stack 14, and by this means the fuel cell stack 14 is heated from the bottom, and the temperature of the combustion chamber 18 has risen by the combustion of the fuel gas and air, and the fuel cell stack 14 is therefore heated from the upper side such that the temperature of the fuel cell stack 14 can be raised in an essentially uniform manner in the vertical direction. Even though the partial oxidation reforming reaction PDX is progressing, the ongoing combustion reaction between fuel gas and air is continued in the combustion chamber 18.

When the reformer temperature sensor 148 detects that the reformer 20 has reached a predetermined temperature (e.g. 600° C.) after the start of the partial oxidation reforming reaction PDX, a pre-blended gas of fuel gas, reforming air, and steam is applied to the reformer 20 by the water flow rate regulator unit 28, the fuel flow rate regulator unit 38, and the reforming air flow rate regulator unit 44. At this point an auto-thermal reforming reaction ATR, which makes use of both the aforementioned partial oxidation reforming reaction POX and the steam reforming reaction SR described below, proceeds in the reformer 20. This auto-thermal reforming reaction ATR can be internally thermally balanced, therefore the reaction proceeds in a thermally independent fashion inside the reformer 20. In other words, when there is a large amount of oxygen (air), heat emission by the partial oxidation reforming reaction PDX dominates, and when there is a large amount of steam, the endothermic steam reforming reaction SR dominates. At this stage, the initial stage of startup has passed and some degree of elevated temperature has been achieved within the generating chamber 10, therefore even if the endothermic reaction is dominant, there will be no major drop in temperature. Also, the combustion reaction continues within the combustion chamber 18 even as the auto-thermal reforming reaction ATR proceeds.

When the reformer temperature sensor 146 detects that the reformer 20 has reached a predetermined temperature (e.g., 700° C.) following the start of the auto-thermal reforming reaction ATR shown as Expression (2), the supply of reforming air by the reforming air flow rate regulator unit 44 is stopped, and the supply of steam by the water flow rate regulator unit 28 is increased. By this means, a gas containing no air and only containing fuel gas and steam is supplied to the reformer 20, where the steam reforming reaction SR of Expression (3) proceeds.

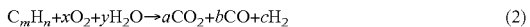

This steam reforming reaction SR is an endothermic reaction, therefore the reaction proceeds as a thermal balance is maintained with the heat of combustion from the combustion chamber 18. At this stage, the fuel cell module 2 is in the final stages of startup, therefore the temperature has risen to a sufficiently high level within the generating chamber 10 so that no major temperature drop is induced in the power generating chamber 10 even though an endothermic reaction is proceeding. Also, the combustion reaction continues to proceed in the combustion chamber 18 even as the steam reforming reaction SR is proceeding.

Thus, after the fuel cell module 2 has been ignited by the ignition device 83, the temperature inside the generating chamber 10 gradually rises as a result of the partial oxidation reforming reaction PDX, the auto-thermal reforming reaction ATR, and the steam reforming reaction SR which proceed in that sequence. Next, when the temperature inside the generating chamber 10 and the temperature of the fuel cell 84 reach a predetermined generating temperature which is lower than the rated temperature at which the cell module 2 can be stably operated, the circuit which includes the fuel cell module 2 is closed, power generation by the fuel cell module 2 begins, and current then flows to the circuit. Generation of electricity by the fuel cell module 2 causes the fuel cell 84 to emit heat, such that the temperature of the fuel cell 84 rises. As a result, the rated temperature at which the fuel cell module 2 is operated becomes, for example, 600° C.-800° C.

Following this, fuel gas and air having respective flow rates greater than those consumed by the fuel cell 84 is applied in order to maintain the rated temperature and continue combustion inside the combustion chamber 18. Generation of electricity by the high reform-efficiency steam reforming reaction SR proceeds while electricity is being generated.

Next, referring to FIG. 8, the operation upon stopping the solid oxide fuel cell (SOFC) device according to the embodiment of the present invention will be explained.

Figure 8:
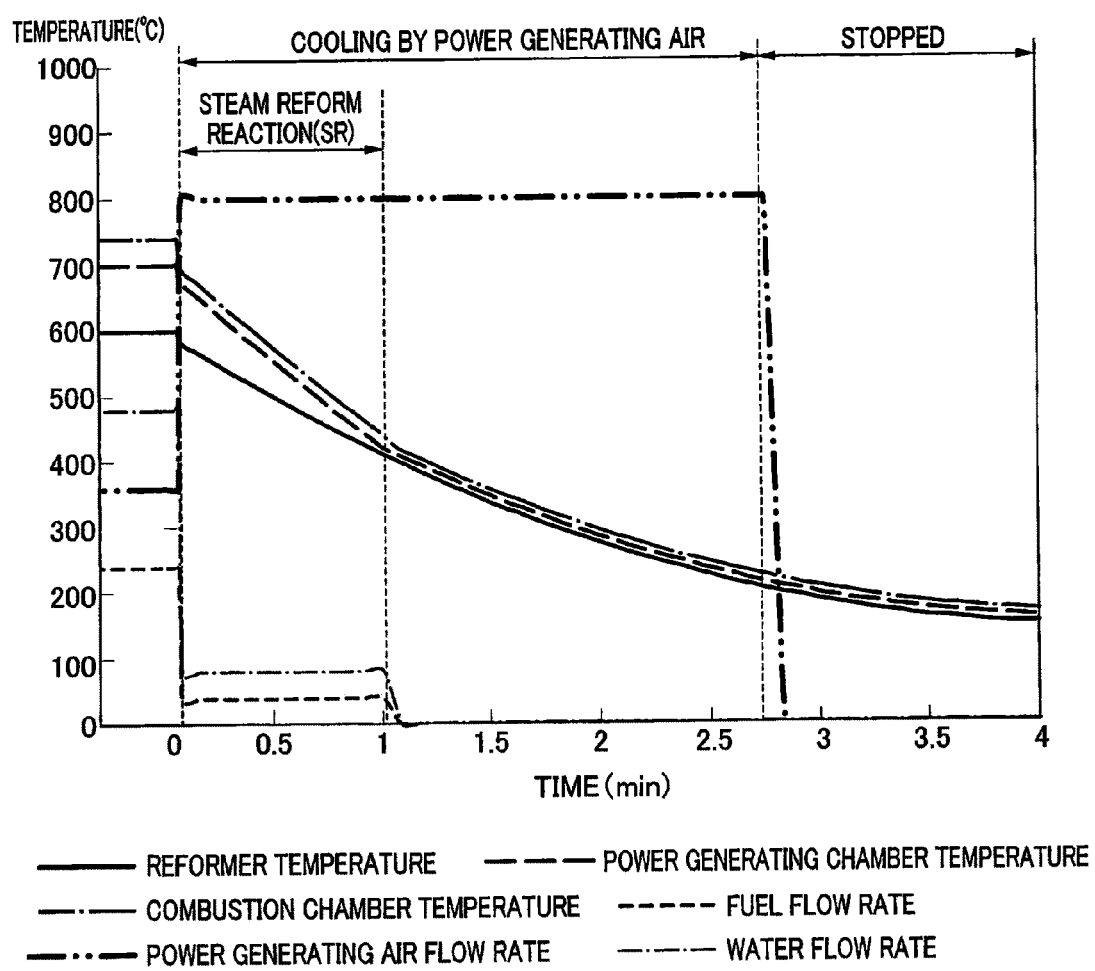
FIG. 8 is a timing chart showing an operation upon stopping of a solid oxide fuel cell device according to an embodiment of the present invention.

As shown in FIG. 8, when stopping the operation of the fuel cell module 2, the fuel flow rate regulator unit 38 and the water flow rate regulator unit 28 are first operated to reduce the flow rates of fuel gas and steam being supplied to the reformer 20.

When stopping the operation of the fuel cell module 2, the flow rate of power generating air supplied by the power generating air flow rate regulator unit 45 into the fuel cell module 2 is being increased at the same time that the flow rates of fuel gas and steam being supplied to the reformer 20 is being reduced; the fuel cell assembly 12 and the reformer 20 are air cooled to reduce their temperature. Thereafter, when the temperature of the generating chamber reaches a predetermined temperature, e.g. 400° C., supply of the fuel gas and steam to the reformer 20 is stopped, and the steam reforming reaction SR in the reformer 20 ends. Supply of the power generating air continues until the temperature in the reformer 20 reaches a predetermined temperature, e.g. 200° C.; when the predetermined temperature is reached, the supply of power generating air from the power generating air flow rate regulator unit 45 is stopped.

Thus in the embodiment of the present invention, the steam reforming reaction SR by the reformer 20 and cooling by power generating air are used in combination, therefore when the operation of the fuel cell module 2 is stopped, that operation can be stopped relatively quickly.

Next, as shown in FIGS. 1 and 6, the solid oxide fuel cell device 1 of the present embodiment is disposed in a facility 56 such as a household or store, and the facility 56 is supplied with generated power from the inverter 54. This facility 56 is connected to a commercial power supply 58, and grid power is supplied from this commercial power supply 58.

In addition, in the solid oxide fuel cell device 1 of the present embodiment, all or a portion of the demand power quantity required by the facility 56 is set as demand power P of the solid oxide fuel cell device 1, and power following operation is performed whereby the electrical generation output value is changed in response to this demand power P.

As shown in FIG. 6, the solid oxide fuel cell device 1 is furnished with a command current value setting section 111 for setting the command current value I S, which is the amount of current for the power to be generated by the solid oxide fuel cell device 1 based on the required power P of the solid oxide fuel cell device 1 as determined from the demand power required by the facility 56.

Next, referring to FIG. 9, the operational state of the solid oxide fuel cell device of the present embodiment during load following will be described.

Here, the electrical power generated by the solid oxide fuel cell device 1 according to the present embodiment (the actual generated power) is controlled based on the demand power required by facilities 56 such as homes and the like (the total demand power), but if the demand power exceeds the maximum rated power which can be generated by the solid oxide fuel cell device 1, the missing portion is supplied by grid power (here, the portion representing the burden demanded of the solid oxide fuel cell device 1 out of the demand power is referred to as required power P (required load P)). Since demand power varies greatly with time, it is difficult for the power generated by the solid oxide fuel cell 1 to completely follow this demand power. Therefore the power generated by the solid oxide fuel cell device 1 (the fuel cell module 2) is controlled using as a target value a command power in which variation in required power P is kept down to a followable level. In addition, even when fuel supply rate and the like is controlled based on a command power, time is required to actually generate electrical power within the fuel cell module 2, therefore a time delay arises the actual generated power extracted from the fuel cell module 2 after fuel is supplied, hence the inverter permitted power serving as permission signal, which is the permitted value for actually extracting power output to the inverter, is output by anticipating a time delay from the start of the supply of fuel.

Note that, in the present embodiment, the solid oxide fuel cell device 1 operates so that the output voltage of the inverter 54 is a constant value 100V, therefore the above-described required power, maximum rated power, inverter permitted power, and actual generated power are respectively proportional to the required current, maximum rated current, inverter permitted current, and actual generated current. While the solid oxide fuel cell device 1 of the present embodiment is controlled based on these current values, the solid oxide fuel cell 1 may also be controlled in the same fashion, replacing "current" in the above with "power." Note that, in the claims of the present invention, "power" is used in a broad meaning (command power, inverter permitted power, etc.) where reference is made to controlling current, and that this is not a description in which the interpretation is limited to current.

Figure 9:
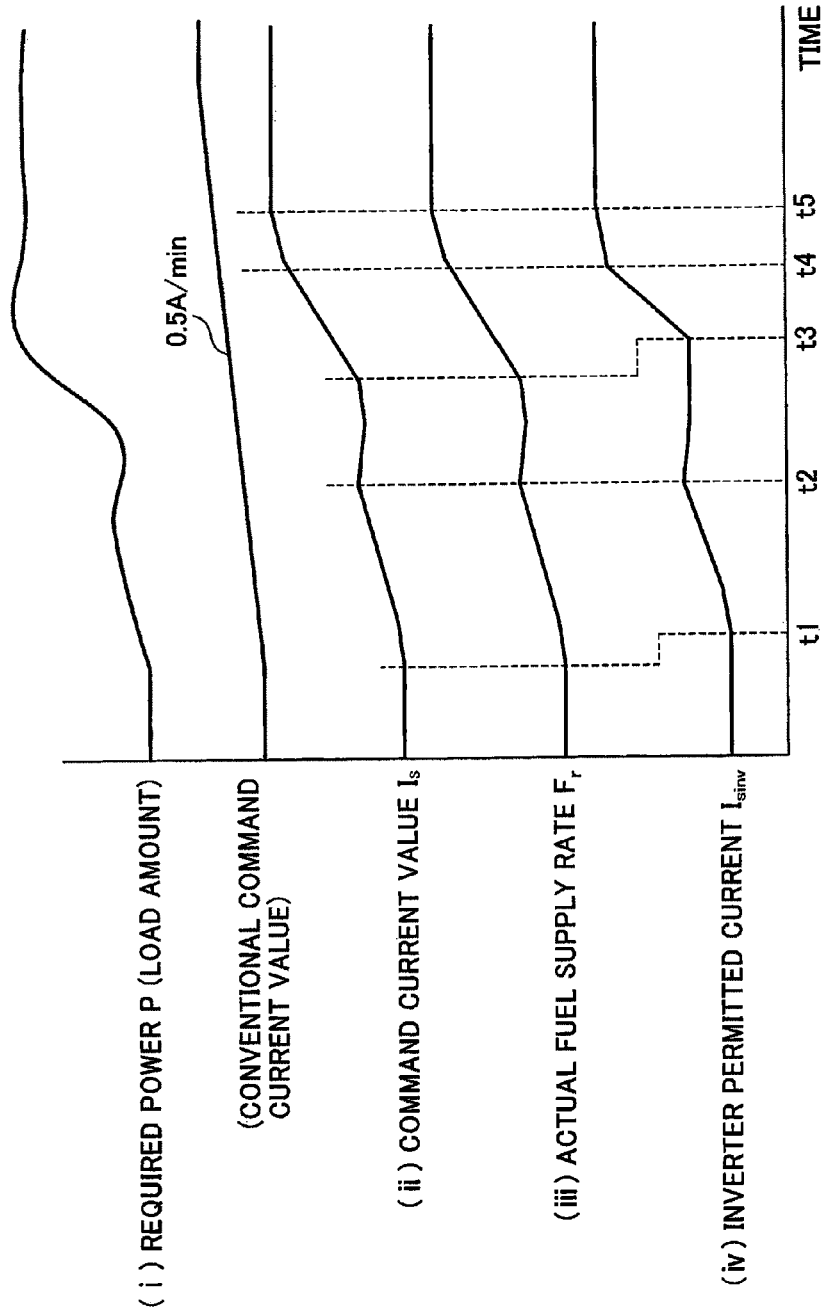
FIG. 9 is a timing chart showing an operating state of a solid oxide fuel cell device during load following according to an embodiment of the present invention, when the fuel supply rate is changed in response to the load amount of required power.

Next, FIG. 9 is a timing chart showing the operating state during load following, when the electrical generating output value is changed in response to the demand power on the solid oxide fuel cell device 1 according to the embodiment of the present invention. Here, the horizontal axis of the FIG. 9 shows time, and the typical times at which the command current value $I_s$ changes are shown by times t1-t5. At the same time, the vertical axis of FIG. 9 shows in a time line from top to bottom as (i)-(iv) the processes by which, starting from the setting of required power P, the inverter permitted current $I_{sinv}$ permitting the extraction of the actual generated power $P_r$ is output at the inverter 54.

First, as shown in FIG. 9, in the solid oxide fuel cell device 1, when the required power P (load amount) for the solid oxide fuel cell 1 needed by the facility 56 is determined from the demand power (see FIG. 9 "(i) Required Power P"), the command current Is, which is the amount of current to be generated by the solid oxide fuel cell 1, is set based on the required power P by the command current value setting section 111 (see FIG. 9 "(ii) Command Current $I_s$").

Here, in the present embodiment the command current $I_s$ is set by changing the amount of change per unit time based on the amount of load, which is the required power P. Note that in conventional solid oxide fuel cell device, the amount of change per unit time in the command current was set, for example, at 0.5 A/min in order to prevent breakage of cells, so that it grew at a rather slow rate.

Next, the control section 110 sets the fuel supply amount F supplied to the reformer 20 in the fuel cell module 2 from the fuel flow regulator unit 38 based on the command current $I_s$ set by the command current value setting section 111. The fuel flow regulator unit 38 is controlled to increase or decrease the fuel supply rate F in accordance with the change in the command current Is, so that at least the command current Is can be output, and fuel is supplied to follow the required load.

At the same time, the actual fuel supply rate $F_r$, which is the actual measured value of the fuel supply rate supplied to the reformer 20 from the fuel flow regulator unit 38, is detected by a fuel flow rate sensor 132 (see FIG. 9 "(iii) Actual Fuel Supply Rate $F_r$).

Next, the control section 110 sets the generating air supply rate A supplied to the fuel cell assembly 12 in the fuel cell module 2 from the generating air flow regulator unit 45 based on the command current Is set in the command current value setting section 111, and on the previously detected actual fuel supply rate $F_r$.

Similarly, the control section 110 also sets the water supply rate W supplied to the reformer 20 in the fuel cell module 2 from the water flow regulator unit 28 based on the command current Is set in the command current value setting section 111 and on the previously detected actual fuel supply rate $F_r$.

Next, the control section 110 permits the extraction of the actual generated power $P_r$ and sends an inverter permitted current $I_{sinv}$ control signal corresponding to the command current Is to the inverter 54, thereby controlling the power supply rate supplied to the facility 56. Here, in the solid oxide fuel cell device 1 according to the present embodiment, the inverter permitted current $I_{sinv}$ normally corresponds to a value for the current actually output from the fuel cell module 2 to the inverter 54 (actual generated current$_r$) (see FIG. 9 "(iv) Inverter Permitted Current $I_{sinv}$").

As shown in FIG. 9, in the solid oxide fuel cell device 1 of the present embodiment, the amount of change per unit time in the inverter permitted current value $I_{sinv}$ commanded to the inverter 54 is changed based on the load status (described in detail below); that is, the system has been given the characteristic that a plurality of differing values for the amount of change per unit time are obtained for the inverter permitted current value, thus preventing fuel cell breakage associated with fuel depletion or air depletion, while saving energy by raising load following characteristics, thus increasing generated power from the fuel cell and reducing grid power from commercial power sources. The control section 110 thus changes the amount of change per unit time for the inverter permitted current value $I_{sinv}$, and this changed inverter permitted current value $I_{sinv}$ per unit time is output to the inverter 54.

Next, referring to FIGS. 10 through 17, the control exercised by the control section 110, which changes the amount of change per unit time in the inverter permitted current value relative to the amount of load for load following by the solid oxide fuel cell device of the present embodiment will be described. Examples in which the amount of change per unit time in the inverter permitted current value is changed under various load conditions to increase load following performance and thereby improve energy saving performance will be described; these examples can be freely combined as needed.

First, referring to FIG. 10, Example 1 of the control according to the present embodiment will be described, whereby the amount of change per unit time in the inverter permitted current value is changed.

Figure 10:
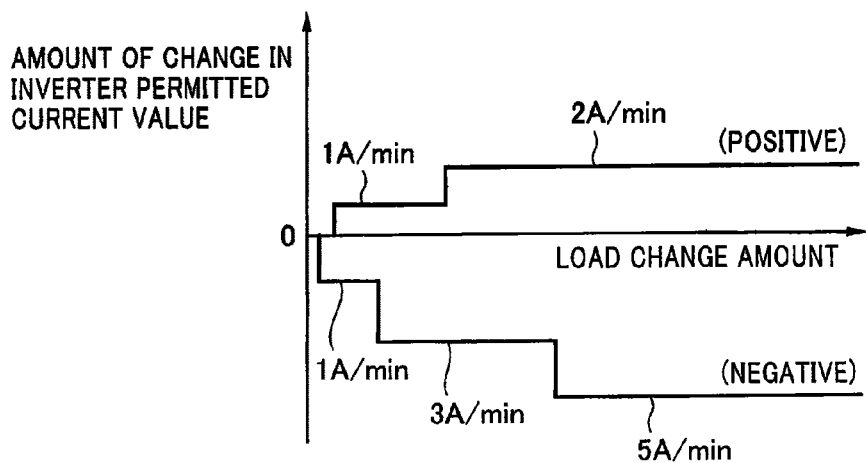
FIG. 10 is a diagram showing Example 1 of the control of the amount of change per unit time of the inverter permitted current value in the solid oxide fuel cell device according to an embodiment of the present invention.

As shown in FIG. 10, the amount of change per unit time in the inverter permitted current value (the inverter permitted current value change amount) is determined by the amount of change in load (load change amount) and the positive or negative the polarity state of the load change amount.

First, the amount of change per unit time in the inverter permitted current value is set to be smaller when the amount of change in the load is small than when it is large. Specifically, when the amount of load change is small, it is set at 1 A/min (load change amount is positive), 1 A/min, and 3 A/min (load change amount is negative); and when the load change amount is large, it is set at 2 A/min (load change amount is positive) and 5 A/min (load change amount is negative).

When the amount of change in load is large from the past to the present, the amounts of fuel and air supplied to the fuel cell module 2 can be increased, so that the fuel and air pressure fluctuation increases due to this increase in supply rate, thereby making the supply to each fuel cell 84 more uniform. In contrast, when the amount of change in the load is small, the fluctuation in fuel and air pressure is also small, making it difficult to supply each of the fuel cells 84 in a uniform manner. Therefore in Example 1 of the present embodiment, the amount of change per unit time in the next inverter permitted current value was changed to be a smaller value when the amount of change is load was small than when it was large, so that target amounts of fuel and air were not supplied in a portion of the fuel cells, and notwithstanding the partial insufficient state, the inverter extracted electrical power, thereby preventing the degradation or breakage of fuel cells. Next, as shown in FIG. 10, while it is true that the amount of change per unit time in the inverter permitted current value (the inverter permitted current value change amount) is changed in both the case in which the load change amount is positive (load amount is increasing) and the case in which it is negative (load amount is decreasing), the amount of change per unit time in the inverter permitted current value (the inverter permitted current value change amount) is changed to a larger value when the load change amount is negative than when it is positive.

Thus, in Example 1 of the present embodiment, when the amount of change per unit time in the inverter permitted current value from the past to the present is negative, i.e., when load decreases, the amount of change for the next inverter permitted current value is selected to have a proportionality characteristic whereby the amount of change per unit time is greater than when load increases, therefore when excessive fuel is being supplied relative to the target, the supply of fuel can be quickly reduced to the target value, thereby increasing fuel cell following performance and preventing unnecessary fuel waste. On the other hand, when the load suddenly increases, it is necessary to supply fuel and air in amounts suited to the increase in inverter permitted current value in order to increase the next inverter permitted current value, but at this point fuel or air supply delays or fuel reforming delays may occur, so that some time is needed until a state is achieved whereby power is actually extracted from the fuel cell module, leading to the risk of fuel cell degradation or breakage if current is extracted by the inverter before that. Therefore in Example 1 of the present embodiment, when the amount of change per unit time in the inverter permitted current value from the past to the present is positive, i.e. when the load amount has suddenly increased, the amount of change per unit time in the inverter permitted current value is changed to a value which is smaller than when the load decreases, thereby enabling the suppression of problems arising from fuel cell module following delays, and reliably preventing the degradation and breakage of fuel cells arising from excessive extraction of current by the inverter.

Next, referring to FIG. 11, Example 2 of the control according to the present embodiment will be described, whereby the amount of change per unit time in the inverter permitted current value is changed.

Figure 11:
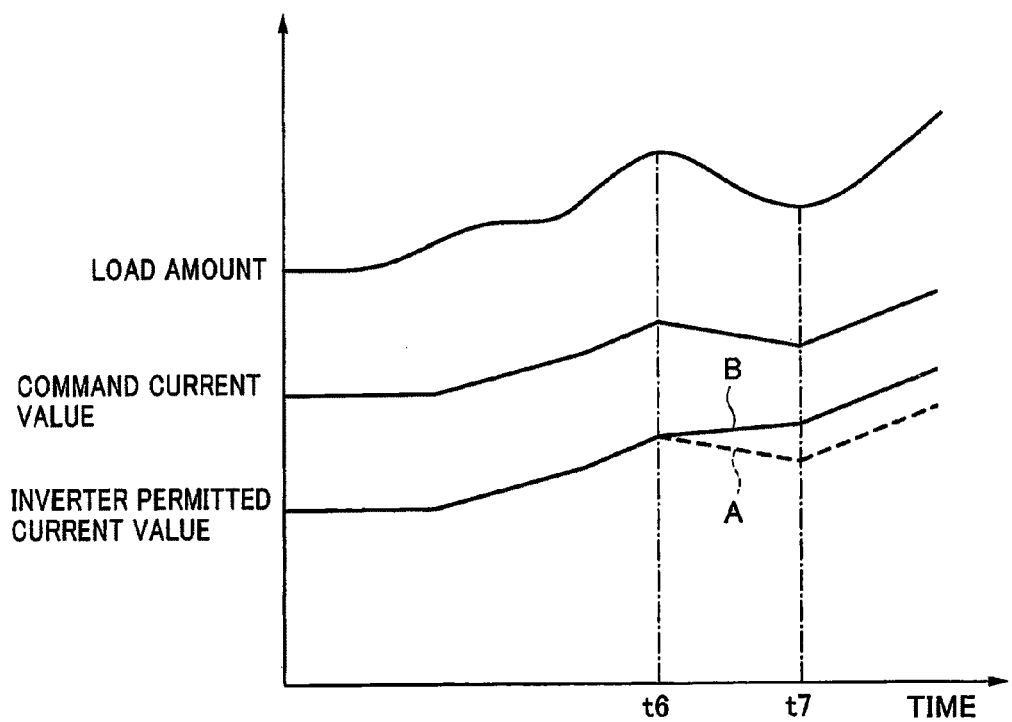
FIG. 11 is a diagram showing Example 2 of the control of the amount of change per unit time of the inverter permitted current value in the solid oxide fuel cell device according to an embodiment of the present invention.

As shown in FIG. 11, during the interval between times t6-t7, the deviation between the present inverter permitted current value and the target inverter permitted current value (=the target inverter permitted current value−the present inverter permitted current value) is positive (target inverter permitted current value>present inverter permitted current value) and the load amount is decreasing. In Example 2 of the present embodiment, in the state described above the decrease in the amount of change per unit time in the inverter permitted current value is suppressed. Specifically, the amount of change per unit time in the inverter permitted current value is changed from the dotted line A to the solid line B.

In the state that the deviation in the present inverter permitted current value relative to the target inverter permitted current value is positive and the load amount is decreasing from the present to the next, the load amount is theoretically decreasing, therefore the deviation in the present inverter permitted current value relative to the target inverter permitted current value should become negative, however in actuality the conditions described above obtain due to the load following delay of the fuel cell module. For that reason, in Example 2 of the present embodiment, under those circumstances the amount of change per unit time in the next inverter permitted current value is changed so as to suppress a decrease in the amount of change in the next inverter permitted current value, thereby shortening the time needed to approach the target inverter permitted current value, resulting in an increase in generated power obtained from the fuel cell and a decrease in grid power obtained from commercial power supplies, thereby saving energy.

Figure 12:
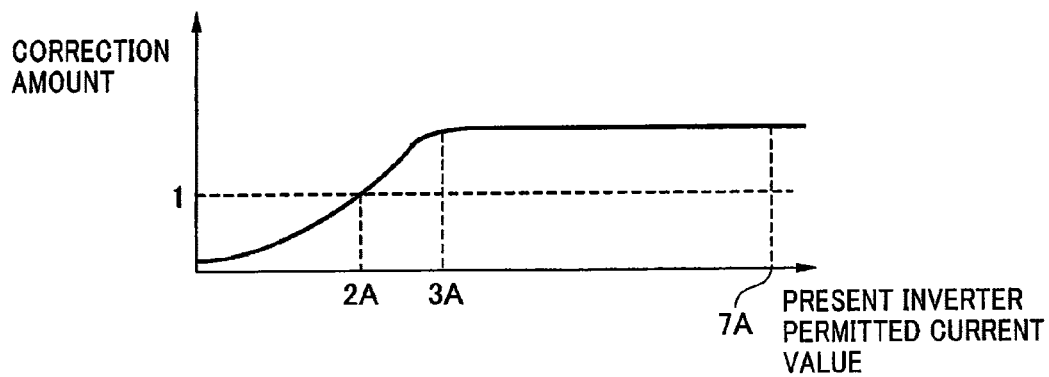
FIG. 12 is a diagram showing Example 3 of the control of the amount of change per unit time of the inverter permitted current value in the solid oxide fuel cell device according to an embodiment of the present invention.

Next, referring to FIGS. 12 and 13, Example 3 of the control according to the present embodiment will be described, whereby the amount of change per unit time in the inverter permitted current value is changed.

In this Example 3, the amount of change per unit time in the next inverter permitted current value is changed (corrected) to a larger value when the present inverter permitted current value is large than when that value is small. Specifically, as shown in FIG. 12, in the region between present inverter permitted current values of 0 A to 3 A, the correction amount of the change amount per unit time in the inverter permitted current value increases with the size of the inverter permitted current value; in the region in which the present inverter permitted current value is 3 A or greater, the amount of correction is a fixed value. When the present inverter permitted current value is 2 A, the correction amount is "1".

Figure 13:
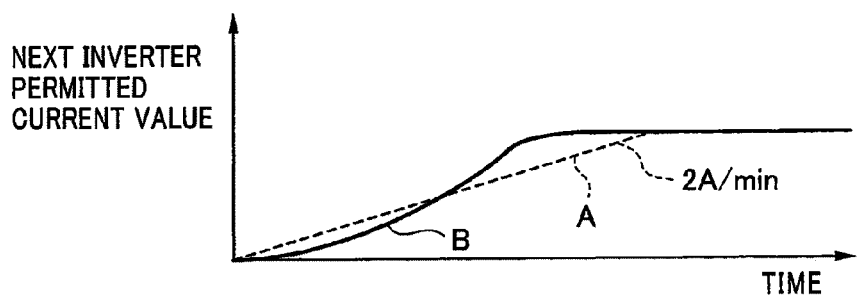
FIG. 13 is a diagram showing Example 3 of the control of the amount of change per unit time of the inverter permitted current value in the solid oxide fuel cell device according to an embodiment of the present invention.

FIG. 13 shows the next inverter permitted current value by changing the amount of change per unit time in the present inverter permitted current value. FIG. 13 shows an example in which the amount of change per unit time in the next inverter permitted current value changed from the present inverter permitted current value is 2 A/min; this change amount is shown by the dotted line A; in actuality, response is as shown by the solid line B.

In Example 3 of the present embodiment, the generating reaction is occurring and the fuel cells are stable at a high temperature when the inverter permitted current value has a large value, i.e., when the amount of power generated by the present fuel cell module 2 is high, therefore negative effects on the fuel cells can be suppressed even when the amount of change per unit time when changing the present inverter permitted current value to the next inverter permitted current value is changed to a greater value when the present inverter permitted current value is large than when it is small in order to increase following sensitivity.

Figure 14:
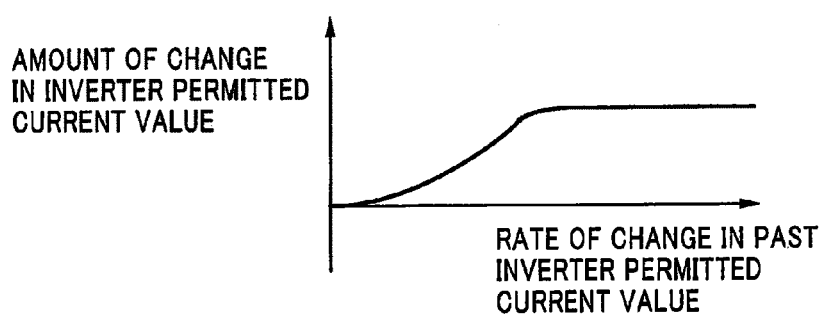
FIG. 14 is a diagram showing Example 3 of the control of the amount of change per unit time of the inverter permitted current value in the solid oxide fuel cell device according to an embodiment of the present invention.

Next, referring to FIG. 14, Example 4 of the control according to the present embodiment will be described, whereby the amount of change per unit time in the inverter permitted current value is changed.

In Example 4 of the present embodiment, the amount of change per unit time in the inverter permitted current value is changed based on the status of the past inverter permitted current value. In other words, when the past inverter permitted current value is increasing and the next inverter permitted current value will also increase, the larger amount of change per unit time in the next inverter permitted current value is changed to increase, the larger the past inverter permitted current value rate of change was.

It is preferable to use the average value of the differential in inverter permitted current values over the last 5 times, for example, as the past inverter permitted current value state. An average value for the last 5 times of the inverter permitted current value itself may also be used.

When the amount of change per unit time in the inverter permitted current value from the past to the present is small, a large amount of change per unit time in the inverter permitted current value from the present to the next will cause a sudden change, leading to a risk of fuel reforming delays in the reformer or fuel or air supply delays and the like. At the same time, when the amount of change per unit time in the inverter permitted current value from the past to the present is large, the supply amounts of fuel, air, and water are currently in the process of changing at a predetermined rate of change; in such cases, because the system is already in the process of changing, the occurrence of large fuel reform delays or fuel and air supply delays can be prevented even if the amount of change per unit time in the inverter permitted current value is large from the present to the next. Therefore in Example 4 of the present embodiment, when the past inverter permitted current value is increasing and the next inverter permitted current value is also increasing, a change is made so that the larger amount of change per unit time in the next inverter permitted current value increases, the larger the amount of change per unit time in the past inverter permitted current value is, so following performance can be increased and energy savings improved, while negative effects on the fuel cells are suppressed.

Figure 15:
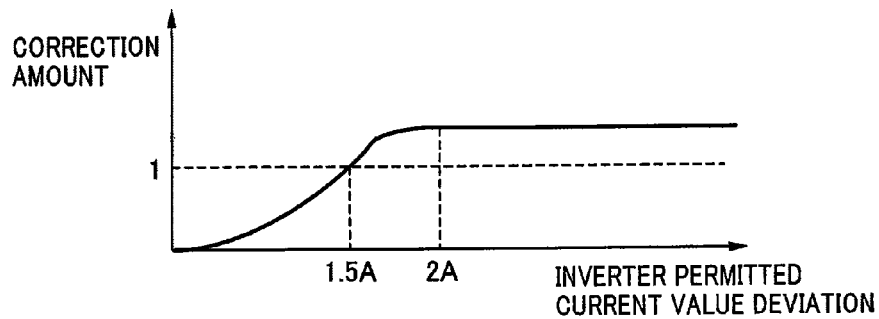
FIG. 15 is a diagram showing Example 5 of the control of the amount of change per unit time of the inverter permitted current value in the solid oxide fuel cell device according to an embodiment of the present invention.

Next, referring to FIG. 15, Example 5 of the control according to the present embodiment will be described, whereby the amount of change per unit time in the inverter permitted current value is changed.

In this Example 5, the amount of change per unit time in the present inverter permitted current value is changed (corrected) to be more greater, the larger the deviation relative to the target inverter permitted current value is. Specifically, as shown in FIG. 15, in the region where the inverter permitted current value deviation is between 0 A and 3 A, the correction amount of the change amount per unit time in the inverter permitted current value increases with the size of the inverter permitted current value deviation, and in the region in which the present inverter permitted current value deviation is 2 A or greater, the amount of correction is a fixed value. The inverter permitted current value deviation is 1.5 A, the correction amount is "1".

In Example 5 of the embodiment, the amount of change per unit time in the present inverter permitted current value is changed (corrected) so as to be large to the degree that the deviation of the present inverter permitted current value is large relative to the target inverter permitted current value, therefore following performance can be improved. Furthermore, in the convergence process in which the deviation is reduced, the amount of change per unit time in the inverter permitted current value slowly reaches the target inverter permitted current value, therefore fuel depletion can be reliably prevented.

Next, referring to FIG. 16, Example 6 of the control according to the present embodiment will be described, whereby the amount of change per unit time in the inverter permitted current value is changed.

In this Example 6, proportionality characteristics indicating the amount of change per unit time for three different inverter permitted current values are prepared (set) ahead of time; one of these proportionality characteristics is selected according to the amount of change in load (load change amount), and the amount of change per unit time in inverter permitted current value is changed according to this selected proportionality characteristic.

Figure 16:
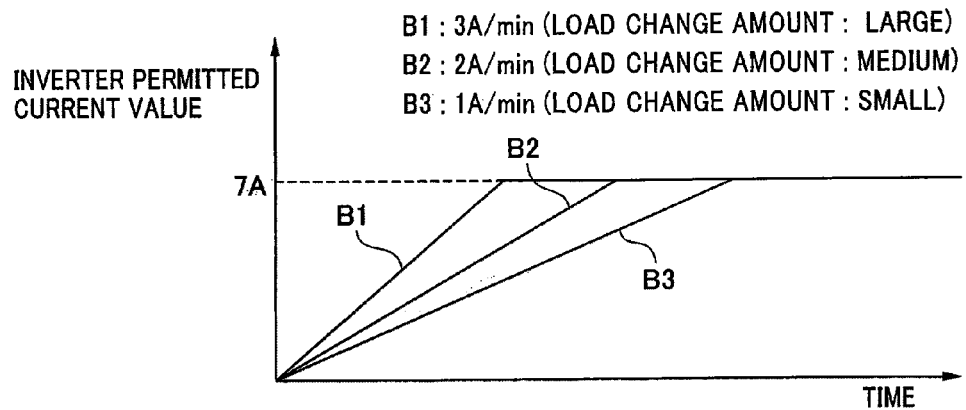
FIG. 16 is a diagram showing Example 6 of the control of the amount of change per unit time of the inverter permitted current value in the solid oxide fuel cell device according to an embodiment of the present invention.

Specifically, as shown in FIG. 16, what is prepared is a 3 A/min proportionality characteristic B1 for the inverter permitted current value amount of change per unit time when the load change amount is large, a 2 A/min proportionality characteristic B2 for the inverter permitted current value amount of change per unit time when the load change amount is medium, and a 1 A/min proportionality characteristic B3 for the inverter permitted current value amount of change per unit time when the load change amount is small; one of these proportionality characteristics is selected according to the size of the load change amount.

In this Example 6, three different proportionality characteristics indicating the inverter permitted current value amount of change per unit time are prepared ahead of time; one of these three proportionality characteristics is selected based on the state of the load, and the next inverter permitted current value amount of change per unit time is changed by using this selected proportionality characteristic, thus simplifying fuel cell control and stabilizing changes in the inverter permitted current value with respect to the changing load state; as a result, fuel supply, air supply, and the reformer reaction can be stabilized.

Next, in the present embodiment, Example 7 of the control according to the present embodiment will be described, whereby the amount of change per unit time in the inverter permitted current value is changed.

In this Example 7, the amounts of change (large, medium, small) in load corresponding to the multiple proportionality characteristics are set to fall within a minimum and maximum range of inverter permitted current values determined by the load amount, and are further restricted so that the proportionality characteristic B1 which determines the amount of change in the maximum load amount is selected even when the load change amount exceeds the maximum load change amount (load change amount=large) determined by the proportionality characteristic B1.

In this Example 7, the amount of change per unit time in the inverter permitted current value is kept down even when the load amount changes greatly, thereby enabling a stabilization of fuel, air, and reform reaction.

Next, referring to FIG. 17, Example 8 of the control according to the present embodiment will be described, whereby the amount of change per unit time in the inverter permitted current value is changed.

In this Example 8, three different proportionality characteristics for the deviation in the present inverter permitted current value relative to the target inverter permitted current value are prepared (set); one of these proportionality characteristics is selected based on the amount of the deviation, and the amount of change per unit time in the present inverter permitted current value is changed according to this selected proportionality characteristic.

Figure 17:
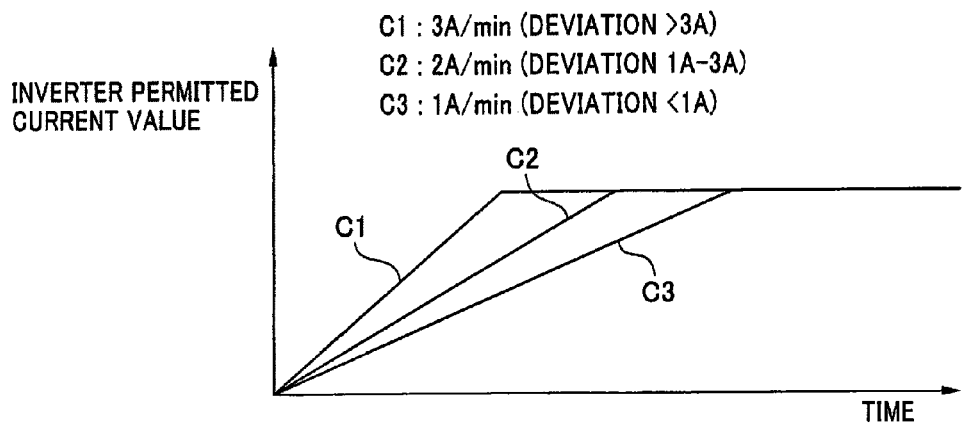
FIG. 17 is a diagram showing Example 8 of the control of the amount of change per unit time of the inverter permitted current value in the solid oxide fuel cell device according to an embodiment of the present invention.

Specifically, as shown in FIG. 17, what are prepared are a proportionality characteristic C1 for which the deviation of the present inverter permitted current value relative to the target inverter permitted current value is 3 A or greater, a proportionality characteristic C2 for a deviation of 1 A to 3 A, and a proportionality characteristic C3 for a deviation of less than 1 A; one of these proportionality characteristics is selected in accordance with the size of the deviation.

In this Example 8, multiple proportionality characteristics are prepared (set) ahead of time in correspondence to the deviation of the present inverter permitted current value relative to the target inverter permitted current value, therefore fuel cell control can be simplified and the change in the inverter permitted current value relative to the changing deviation can be stabilized, resulting in a stabilization of the fuel supply, the air supply, and the reform reaction.

Furthermore, in the present embodiment the following control may also be exercised simultaneously with the above-described Examples 1 through 8. That is, it is also acceptable to vary the fuel supply rate supplied in response to the amount of change per unit time in the deviation of the present inverter permitted current value relative to the target inverter permitted current value while simultaneously changing the amount of change per unit time in the deviation of the present inverter permitted current value relative to the target inverter permitted current value.

By this means, the amount of fuel supplied is varied in response to the amount of change per unit time in the inverter permitted current value at the same time that the amount of change per unit time in the inverter permitted current value is being changed, thereby enabling increased load following characteristics while also greatly increasing the reliability of fuel cells.

Although the present invention has been explained with reference to specific, preferred embodiments, one of ordinary skilled in the art will recognize that modifications and improvements can be made while remaining within the scope and spirit of the present invention. The scope of the present invention is determined solely by appended claims.

What is claimed is:

1. A solid oxide fuel cell system with a load following function which changes a fuel supply in response to a change of a load, comprising:
    a fuel cell module having a fuel cell stack composed of a plurality of solid oxide fuel cells and a reformer that reforms fuel and supplies the reformed fuel to the fuel cells;
    a command power value director that sets a command power value indicative of a value of power to be achieved by the fuel cell module and transitional to follow the change of the load;
    a fuel controller programmed to determine an fuel supply rate and supply the fuel at the determined fuel supply rate so as for the fuel cells to generate electricity at the command power value;
    an inverter that converts electrical power generated by the fuel cell module into alternating power, wherein after the fuel controller starts supplying the fuel to the fuel cells at the determined fuel supply rate, the inverter extracts power from the fuel cell module at a permitted power value which comprises a target permitted power value derived directly from the command power value or an updated permitted power value obtained by updating the target permitted power value or the updated permitted power value; and
    a control section being programmed to update the permitted power value at a change rate, wherein the control section has a plurality of different preset change rates and is programmed to select, from the plurality of preset change rates, one change rate to be applied to update the permitted power value, based on a load change rate at which the load is changing, such that a smaller change rate is selected as the load change rate is smaller.

2. The solid oxide fuel cell system according to claim 1, wherein the control section is programmed to select a larger change rate when the load change rate is negative than when it is positive.

3. The solid oxide fuel cell system according to claim 1, wherein the control section is programmed to make a selection to reduce a decrease of the change rate applied to update the updated permitted power value when the target permitted power value derived directly from the command value is larger than the updated permitted power value, and the load is declining.

4. The solid oxide fuel cell system according to claim 1, wherein the control section is programmed to select a larger change rate when the permitted power value to be updated is larger.

5. The solid oxide fuel cell system according to claim 1, wherein the control section is programmed to select a larger change rate to update the permitted power value when a series of permitted power values immediately preceding the permitted power value to be updated is larger.

6. The solid oxide fuel cell device according to claim 1, wherein the control section is programmed to select a larger change rate to update the updated permitted value when a deviation of the target permitted power value derived directly from the command power value from the updated permitted power value to be updated is larger.

* * * * *